W. CLEMSON.
MACHINERY FOR GRINDING CIRCULAR SAWS.

No. 14,950. Patented May 27, 1856.

UNITED STATES PATENT OFFICE.

WM. CLEMSON, OF EAST WOBURN, MASSACHUSETTS.

GRINDING CIRCULAR SAWS.

Specification of Letters Patent No. 14,950, dated May 27, 1856.

*To all whom it may concern:*

Be it known that I, WM. CLEMSON, of East Woburn, in the county of Middlesex and State of Massachusetts, have invented a new and Improved Machine for the Purpose of Grinding Circular Saws, of which the following is a full, clear, and exact description, reference being had to the annexed drawings, making part of this specification, in which—

Figure 1:
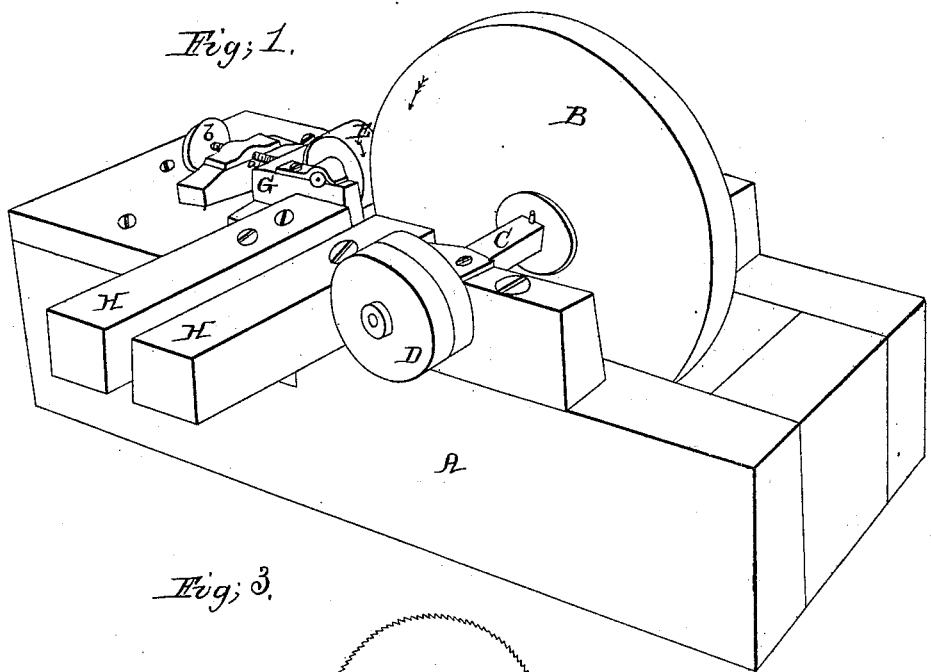
Figure 3:
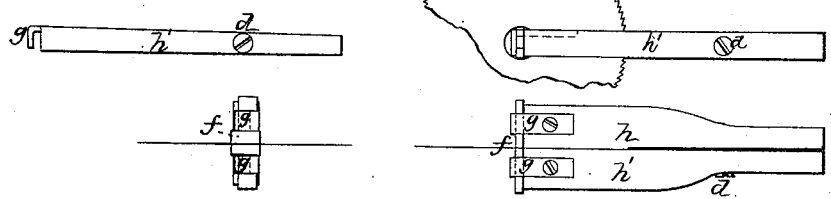
Figure 4:
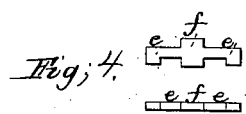
Figure 2:
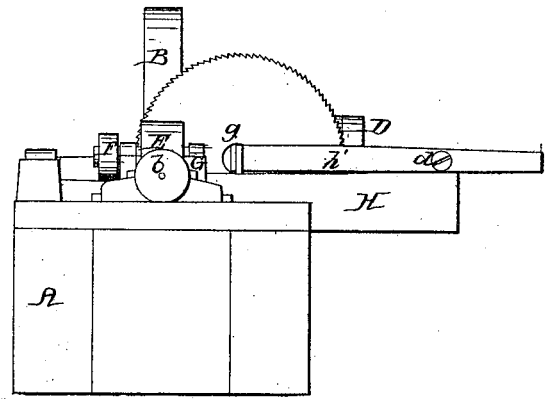

Figure 1 is a perspective view of my machine; Fig. 2, an end view of the same; Figs. 3, 4, details which will be referred to hereafter.

The machines heretofore contrived for the purpose of grinding circular saws have been liable to various objections which it is the object of my present improvement to remedy. Where a single grind stone was employed and the saw was supported upon its opposite surface by a stationary rest, it has not been found practicable to feed the saws with sufficient uniformity to produce perfect work, and recourse was had to a face plate to which the saw was secured and which was caused to revolve slowly and uniformly. Saws thus ground are found to have a waved uneven surface, which greatly injures their appearance and salableness. Where the saw is submitted to the simultaneous action of two grind-stones operating upon opposite sides of it, a tremulous motion of the saw is produced which manifests itself in the finished saw, by an irregular, waved appearance, the undulations or waves upon the surface being finer and smaller than in the former case, but equally objectionable on account of the injury to the appearance of the saw. It has also been found impracticable to finish the saws to the center owing to the fact that the pivot upon which it turns, entirely fills the eye of the saw, and together with the collars employed to secure the saw to the mandrel prevents the stone from being brought so near to the center as is required to grind its entire surface. To remedy these objections is the object of my invention which consists in operating upon the saw with a single stone and supporting its opposite surface by a roll which is caused to revolve at the requisite speed to feed the saw as required.

My invention also consists in the employment of a flat pivot upon which the saw is allowed to turn while being ground and which while it is of sufficient width in one direction to fill the eye of the saw, and steady it as it revolves, is not sufficiently thick to prevent the stone from operating over its entire surface.

To enable others skilled in the art to understand my invention, I will proceed to describe the manner in which I have carried it out.

In the accompanying drawings A, is the frame work of the machine B, the grindstone secured to the arbor C and driven by power applied to the pulleys D.

E, is a metallic roll which revolves in the plane of the stone and is driven in a direction contrary to that in which the stone revolves and with a surface velocity of about one tenth that of the stone, by power applied to the pulley F, upon its shaft. The distance of this roll from the stone is adjusted by the hand screw $a$, which sets in motion the carriage G, in which the roll E, runs.

H, are ways set at a suitable distance apart to permit the saw to enter between them, and which serve the purpose of guiding and holding the clamp, in which the saw is held during the operation of grinding.

The roll E, serves the double purpose of feeding the saw to the stone, and of revolving it upon its mandrel. The high velocity of the grindstone tends to revolve the saw rapidly, this tendency is nearly counteracted by the pressure upon the roll E, to the speed of which it is easily controlled by the pressure of the saw holder or clamp, which will now be described. This clamp is represented in Fig. 3, and is composed of two parts $h$ $h'$ which are held together at one end by the pivot upon which the saw turns; at the other end, the two parts are forced together by the screw $d$, by tightening which, sufficient pressure is applied to the saw to prevent it from turning frivolously.

In order that the stone may be made to operate to the very eye of the saw the pivot upon which the latter turns is made flat as seen in the various figures, the width of the central portion $f$, being equal to the diameter of the eye of the saw; the notches $e$, passing over the ears $g$, upon the clamp and holding the two parts $h$ $h'$ together. When the grinding is completed it is simply necessary to raise the pivot out of the ears $g$ and remove the saw from the clamp.

Operation: The grindstone is revolved rapidly and the metallic roll slowly in opposite directions as indicated by the arrows. The saw is secured in the clamp as represented in Fig. 3 and is inserted between the stone and the roll E, the two being set the requisite distance apart to give the required thickness to the saw. The latter is clamped with sufficient force by the screw $d$, to permit it to revolve with the roll E, but not with the grindstone, which is thus caused to operate upon the saw while it is slowly revolved with the roll. The saw is thus held steadily while it is operated upon by the stone, and the tremulous motion and consequent waved appearance of the surface is entirely avoided. By means of the flat pivot, I am enabled to grind the entire surface of the saw, the stone being allowed to operate even within the eye, as will be apparent from an inspection of Fig. 3.

What I claim as my invention and desire to secure by Letters Patent is—

1. The combination of the roll E, with the grindstone B, operating in the manner substantially as herein set forth.

2. The use of the flat pivot for the purpose of enabling the stone to operate upon the entire surface of the saw.

WM. CLEMSON.

Witnesses:
D. MACFARLANE,
ALBERT L. RICHARDSON.